United States Patent
Kao et al.

(10) Patent No.: US 9,606,639 B2
(45) Date of Patent: Mar. 28, 2017

(54) POINTING SYSTEM AND DISPLAY HAVING IMPROVED OPERABLE RANGE

(71) Applicant: PIXART IMAGING INC., Hsin-Chu County (TW)

(72) Inventors: Ming-Tsan Kao, Hsin-Chu County (TW); Chia-Cheun Liang, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 14 days.

(21) Appl. No.: 14/096,279

(22) Filed: Dec. 4, 2013

(65) Prior Publication Data

US 2014/0191959 A1    Jul. 10, 2014

(30) Foreign Application Priority Data

Jan. 9, 2013    (TW) .............................. 102100691 A

(51) Int. Cl.
| | |
|---|---|
| *G06F 3/0354* | (2013.01) |
| *G06F 3/0346* | (2013.01) |
| *G06F 3/033* | (2013.01) |
| *G06F 3/03* | (2006.01) |
| *G06K 9/46* | (2006.01) |

(52) U.S. Cl.
CPC ............ *G06F 3/0346* (2013.01); *G06F 3/033* (2013.01); *G06F 3/0304* (2013.01); *G06F 3/0308* (2013.01); *G06F 3/0317* (2013.01); *G06F 3/0325* (2013.01); *G06F 3/0354* (2013.01); *G06K 9/46* (2013.01)

(58) Field of Classification Search
None
See application file for complete search history.

(56) References Cited

U.S. PATENT DOCUMENTS

| | | | | |
|---|---|---|---|---|
| 5,030,945 A | * | 7/1991 | Yeomans | G06T 3/00 345/676 |
| 5,448,261 A | * | 9/1995 | Koike et al. | 345/158 |
| 5,757,358 A | * | 5/1998 | Osga | 715/862 |
| 6,049,326 A | * | 4/2000 | Beyda | G06F 3/0482 345/157 |
| 6,417,836 B1 | * | 7/2002 | Kumar | G06F 3/0325 345/156 |
| 7,611,412 B2 | * | 11/2009 | Lin | A63F 13/04 345/156 |
| 7,834,848 B2 | * | 11/2010 | Ohta | 345/157 |

(Continued)

FOREIGN PATENT DOCUMENTS

WO    WO2012/114240    8/2012

OTHER PUBLICATIONS

Han-Ping Cheng; Chao-Chien Huang; Chia-Cheun Liang; U.S. Appl. No. 13/771,072, filed Feb. 19, 2013.

*Primary Examiner* — Dismery Mercedes
(74) *Attorney, Agent, or Firm* — Hauptman Ham, LLP

(57) ABSTRACT

There is provided a pointing system including an image sensor, a plurality of reference marks and a processing unit. The image sensor is configured to capture image frames containing at least one reference mark image of the reference marks. The processing unit is configured to recognize an image number of the reference mark image and calculate an aiming point coordinate according to a positioning algorithm associated with the image number.

14 Claims, 8 Drawing Sheets

(56) References Cited

U.S. PATENT DOCUMENTS

| | | | |
|---|---|---|---|
| 7,857,703 B2 | 12/2010 | Lin et al. | |
| 8,206,221 B2 | 6/2012 | Lin et al. | |
| 8,228,293 B2* | 7/2012 | Dohta | A63F 13/10 345/158 |
| 8,300,011 B2* | 10/2012 | Chao | G09G 5/08 345/156 |
| 8,525,783 B2* | 9/2013 | Sato | A63F 13/10 345/158 |
| 9,285,897 B2* | 3/2016 | Banning | G06F 3/0346 |
| 9,304,607 B2* | 4/2016 | Cheng | G06F 3/0346 |
| 2004/0085443 A1* | 5/2004 | Kallioniemi | G01N 1/36 348/135 |
| 2006/0152489 A1* | 7/2006 | Sweetser | G06F 3/0346 345/158 |
| 2006/0261247 A1* | 11/2006 | Chen | G01S 5/16 250/208.1 |
| 2006/0284841 A1* | 12/2006 | Hong | G06F 3/0325 345/157 |
| 2007/0130582 A1* | 6/2007 | Chang et al. | 725/37 |
| 2007/0216653 A1* | 9/2007 | Chang | G06F 3/04892 345/169 |
| 2007/0273646 A1 | 11/2007 | Chao et al. | |
| 2008/0158436 A1 | 7/2008 | Chao et al. | |
| 2008/0180396 A1 | 7/2008 | Lin et al. | |
| 2008/0266251 A1* | 10/2008 | Chao | G06F 3/0304 345/157 |
| 2008/0284724 A1* | 11/2008 | Alten | G06F 3/0304 345/156 |
| 2008/0309615 A1* | 12/2008 | Sato | A63F 13/10 345/156 |
| 2009/0052730 A1* | 2/2009 | Lin | A63F 13/06 382/100 |
| 2009/0153479 A1* | 6/2009 | Gu | G06F 3/0304 345/158 |
| 2011/0032230 A1* | 2/2011 | Sun | G06F 3/0346 345/207 |
| 2013/0038529 A1* | 2/2013 | Hwang | G06F 3/0487 345/157 |

* cited by examiner

POINTING SYSTEM AND DISPLAY HAVING IMPROVED OPERABLE RANGE

CROSS REFERENCE TO RELATED APPLICATION

This application claims the priority benefit of Taiwan Patent Application Serial Number 102100691, filed on Jan. 9, 2013, the full disclosure of which is incorporated herein by reference.

BACKGROUND

1. Field of the Disclosure

This disclosure generally relates to an interactive system and, more particularly, to a pointing system and a display system that may execute different positioning algorithms according to different reference mark image numbers.

2. Description of the Related Art

An optical pointing system generally utilizes an image sensor to capture reference mark images of a plurality of reference marks, and a positioning algorithm associated with the reference mark images is previously designed and built-in in a processing unit. In actual operation, the processing unit performs the positioning of an aiming point according to the positioning algorithm and the reference mark images captured by the image sensor.

However in some cases, for example a close operating distance, a part of the reference mark images may not be covered in the image frames captured by the image sensor such that the processing unit can not perform the positioning of the aiming point according to the built-in positioning algorithm For example, PCT Patent Publication No. WO2012/114240 discloses a method of "Estimation control feature from remote control with camera". As shown in FIG. 1A, the estimation method utilizes a remote control 10 to capture system beacon images of two system beacons 31, 32 and performs the positioning according to the two system beacon images. When the remote control 10 is not able to simultaneously capture the system beacon images of the two system beacons 31 and 32, the remote control 10 estimates image information of the system beacon images of the two system beacons 31 and 32 according to the light source images of two ambient light sources 41 and 42 at first, and then performs the positioning of an aiming point according to the estimated image information.

As shown in FIG. 1B, when a current image $I_1$ includes only the system beacon image 32' of one system beacon 32 without including the system beacon image 31' of the other system beacon 31, the remote control 10 has to estimate the image information of the system beacon image 31' in the current image $I_1$ according to the system beacon images 31', 32' and the light source images 41', 42' in a previous image $I_2$ of the current image $I_1$ as well as the system beacon image 32' and the light source images 41', 42' in the current image $I_1$.

In other words, the above estimation method has to perform the positioning of an aiming point according to all system beacon images, e.g. 31' and 32'. The positioning of the aiming point can not be performed if all system beacon images can not be acquired.

Accordingly, the present disclosure further provides an interactive system that may use different positioning algorithms according to an image number of different reference mark images thereby effectively improving the operable field of view and the operable distance.

SUMMARY

The present disclosure provides a pointing system and a display system having a large operable range that may perform pointer positioning according to different reference mark image numbers by previously recording different positioning algorithms.

The present disclosure further provides a pointing system and a display system that may employ the image sensing array having a smaller size.

The present disclosure provides a pointing system including a plurality of reference marks and a remote controller. The plurality of reference marks may illuminate light of an identifiable spectrum. The remote controller is configured to capture an image frame containing at least one reference mark image of the reference marks and perform pointer positioning according to a positioning algorithm associated with an image number of the reference mark image in the image frame.

The present disclosure further provides a display system including a display device, a plurality of reference marks and a remote controller. The display device may show a cursor. The plurality of reference marks may illuminate light of an identifiable spectrum. The remote controller is configured to capture an image frame containing at least one reference mark image of the reference marks, calculate and output a cursor coordinate of the cursor according to a positioning algorithm associated with an image number of the reference mark image in the image frame.

The present disclosure further provides a pointing system including a plurality of reference marks and a remote controller. The plurality of reference marks may illuminate light of an identifiable spectrum. The remote controller is configured to capture an image frame containing at least one reference mark image of the reference marks, recognize a reference mark image number in the image frame, output a pointing coordinate according to the image frame when the reference mark image number is equal to a reference mark number of the reference marks, and output a relative displacement according to the image frame when the reference mark image number is smaller than the reference mark number.

In one aspect, the reference marks may be integrated with or separated from the display device, wherein when the reference marks are disposed on an independent device, the reference marks may be disposed at any suitable position that is convenient for user so as to improve the operating convenience.

In one aspect, the remote controller includes a processing unit configured to execute the positioning algorithm associated with different image numbers. For example, the processing unit may execute one of the positioning algorithms associated with the image number of 1-4. In addition, when the image number in the image frame is larger than 4, the processing unit may perform the pointer positioning according to the positioning algorithm associated with the image number of 4 so as to reduce the number of built-in algorithms.

In one aspect, in order to distinguish different reference marks and distinguish the reference marks from ambient light, the reference marks preferably have different features to allow the remote controller to be able to distinguish the features of different reference mark images, wherein said different features may be illuminating with different illumination frequencies or illumination brightness values or allowing each reference mark to have different areas or shapes. If different reference marks can be distinguished, the two-dimensional or three-dimensional rotation angle of the remote controller in operation may be distinguished according to the position and spatial relationship of different reference marks so as to improve the positioning accuracy.

In one aspect, the image frame captured by the remote controller may include only one reference mark image such that the remote controller may optionally include an accelerometer or a G-sensor in cooperation with the relative displacement of the reference mark image in the image frames so as to output the pointing coordinate In addition, the remote controller may calculate the relative displacement according to one of or an average position of more than two reference mark images and may output the pointing coordinate in cooperating with an accelerometer or a G-sensor.

In the pointing system and the display system according to the embodiment of the present disclosure, no matter how many reference mark images are included in the image frame, the remote controller may perform the pointer positioning and calculate the pointing coordinate or relative displacement accordingly. Therefore, even though the user is close to the reference marks or the aiming direction is deviated, the pointer positioning can still be performed correctly. In addition, the remote controller may use the sensing array having a smaller size so as to reduce the cost.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1A:
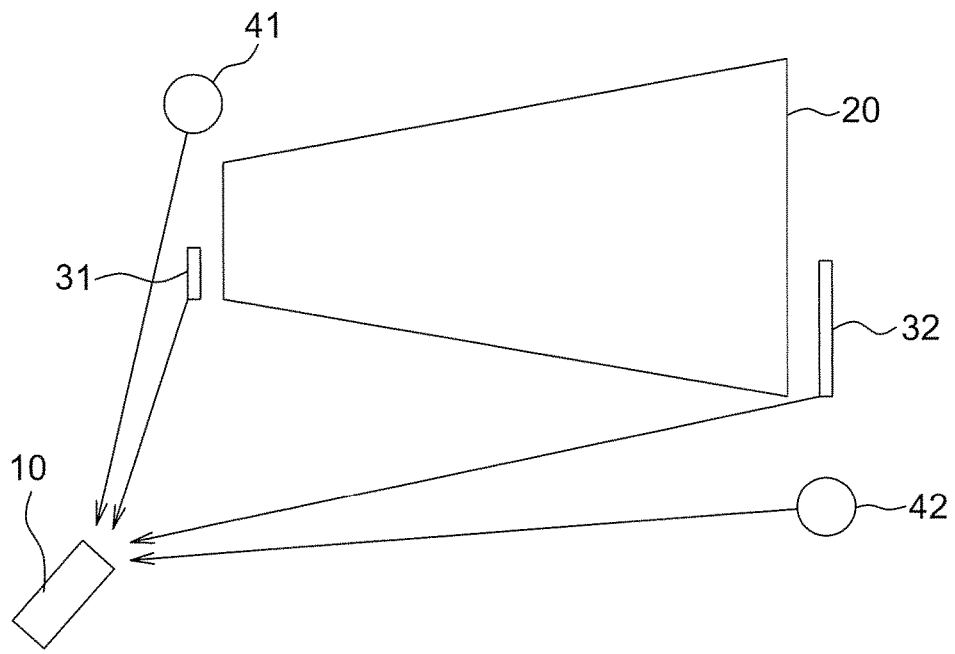
FIG. 1A shows a schematic diagram of the conventional pointing system.
Figure 1B:
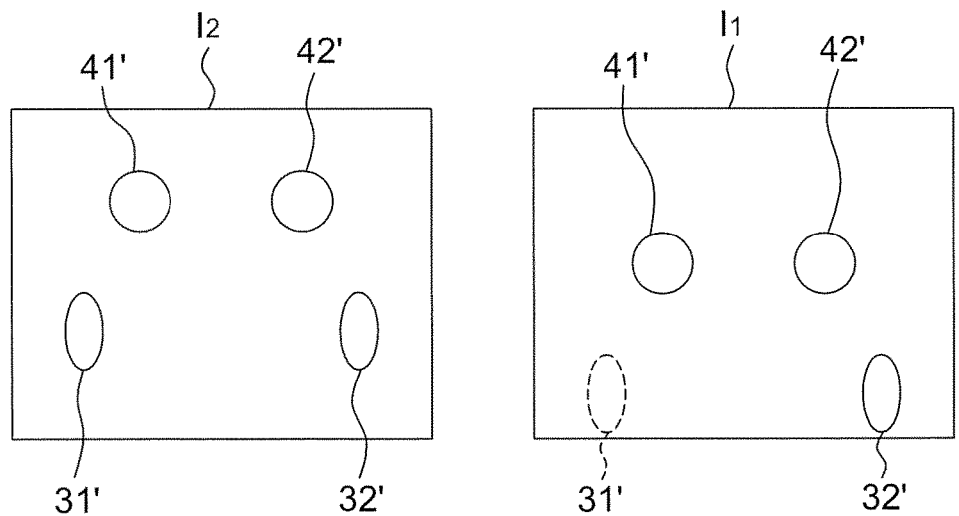
FIG. 1B shows a schematic diagram of the image frames captured by the pointing system of FIG. 1A
Figure 2A:
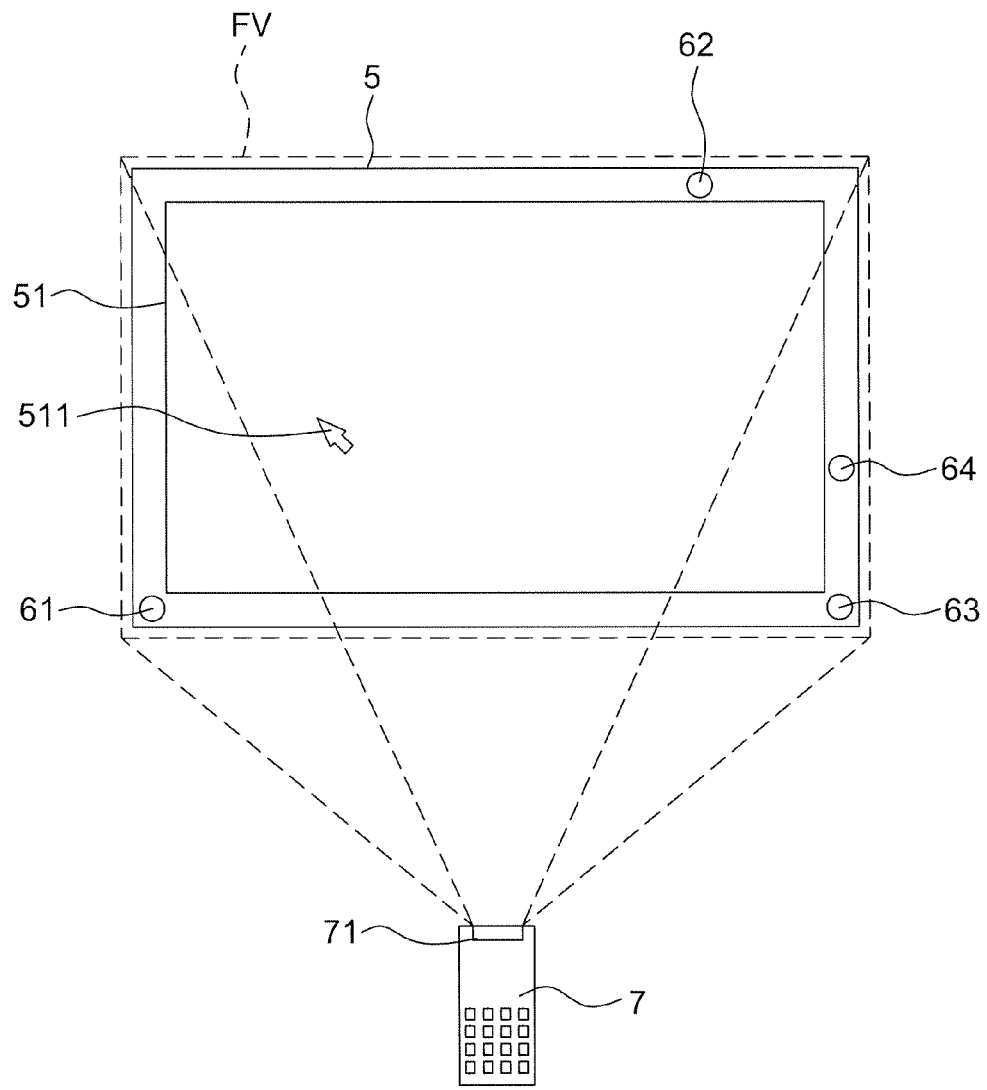
FIG. 2A shows a schematic diagram of the display system according to an embodiment of the present disclosure.
Figure 2B:
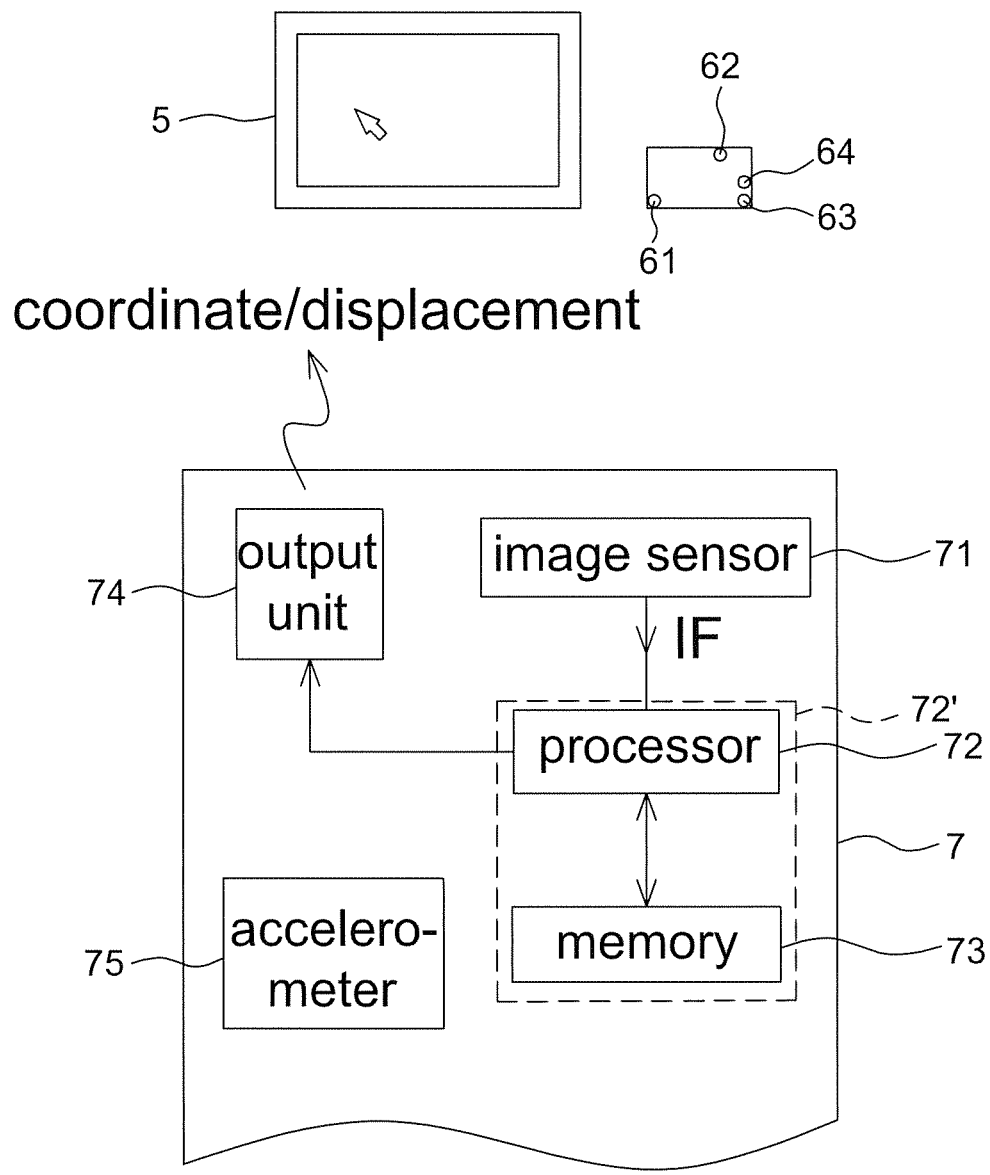
FIG. 2B shows a schematic block diagram of the remote controller of the pointing system and the display system according to an embodiment of the present disclosure.

Referring to FIG. 2A, it shows a schematic diagram of the display system according to an embodiment of the present disclosure, which includes a display device 5, a plurality of reference marks (e.g. four reference marks 61-64 are shown herein, but not limited to) and a remote controller 7. The display device 5 may be a liquid crystal display device, a projection display device, a plasma display device or the like. The display device 5 may have a display screen 51 on which a cursor 511 is shown. The remote controller 7 is adapted to be held by a user (not shown) for correspondingly controlling the display device 5. The reference marks 61-64 may be light emitting diodes, laser diodes or other active dot light sources and may illuminate with an identifiable spectrum. For example, the reference marks 61-64 may illuminate invisible light, e.g. infrared light, so as not to influence the user in watching images shown on the display screen 51. In addition, the reference marks 61-64 may be integrated with the display device 5 (as shown in FIG. 2A) or disposed on an independent device which is physically separated from the display device 5 (as shown in FIG. 2B) as long as the reference marks 61-64 are disposed at a suitable position in operation. It is appreciated that the ratio relationship between every component in FIGS. 2A and 2B are only intended to illustrate but not to limit the present disclosure.

The remote controller 7 is configured to control the movement of the cursor 511 on the display screen 51 or the execution of applications according to the position, spatial relationship or position variation of reference mark images associated with the reference marks 61-64 in the captured image frames. In this embodiment, the remote controller 7 is configured to capture an image frame containing at least one reference mark image of the reference marks and to perform the pointer positioning according to a positioning algorithm associated with an image number of the reference mark image in the image frame, wherein when the remote controller 7 is configured to control the motion of the cursor 511, the remote controller 7 calculates and outputs a cursor coordinate and/or a relative displacement of the cursor 511.

Referring to FIG. 2B, it shows a schematic block diagram of the remote controller 7 of the display system and the pointing system according to an embodiment of the present disclosure, which includes an image sensor 71, a processing unit 72, a memory unit 73 and an output unit 74.

The image sensor 71 may be a CCD image sensor, a CMOS image sensor or other sensors for sensing optical energy. The image sensor 71 may have a field of view FV (as shown in FIG. 2A). The image sensor 71 may capture and output image frames IF at a fixed or variable sampling frequency. It is appreciated that the shape of the field of view FV herein is only intended to illustrate.

The processing unit 72 may be a digital signal processor which receives image frames IF from the image sensor 71 and recognizes an image number of the reference mark image in the image frames IF at first. Next, the processing unit 72 selects and executes a positioning algorithm associated with the image number of the reference mark image so as to perform the pointer positioning, calculate the pointing coordinate, calculate the cursor coordinate and/or calculate the relative displacement.

The memory unit 73 is configured to save different positioning algorithms associated with different image numbers. In one embodiment, the memory unit 73 saves the positioning algorithms respectively associated with the image number of 1-4. In one embodiment, when the image number is larger than 4, as the two-dimensional and three-dimensional rotation angles of the remote controller 7 may be recognized and the pointing coordinate may be calculated according to 4 reference mark images, the remote controller 7 may perform the pointer positioning according to the positioning algorithm associated with the image number of 4. More specifically speaking, when the processing unit 72 recognizes that a number of reference mark images is more than 4, the processing unit 72 may select four of the reference mark images to perform the pointer positioning, calculate the cursor coordinate and/or calculate the relative displacement. In another embodiment, the remote controller 7 may be built-in with the positioning algorithms associated with 5, 6 or more reference mark images without particular limitation. In one embodiment, the memory unit 73 may be included in the processing unit 72 to form a processing unit 72' such that the processing unit 72' has the function of the memory unit 73. The processing unit 72' receives the image frames IF from the image sensor 71 and recognizes an image number of the reference mark image in the image frames IF at first, and then selects and executes one of the positioning algorithms associated with different image numbers.

The output unit 74 wired or wirelessly transmits the result obtained by the processing unit 72 to the display device 5 to perform corresponding control, wherein wired and wireless transmission techniques are well known and thus details thereof are not described herein.

When a field of view FV of the image sensor 71 covers all reference marks, the remote controller 7 may recognize that the image frames IF captured thereby include N reference mark images, and may perform the pointer positioning, calculate the pointing coordinate, calculate the cursor coordinate and/or calculate the relative displacement according to the positioning algorithm associated with N reference mark images.

Figure 3:
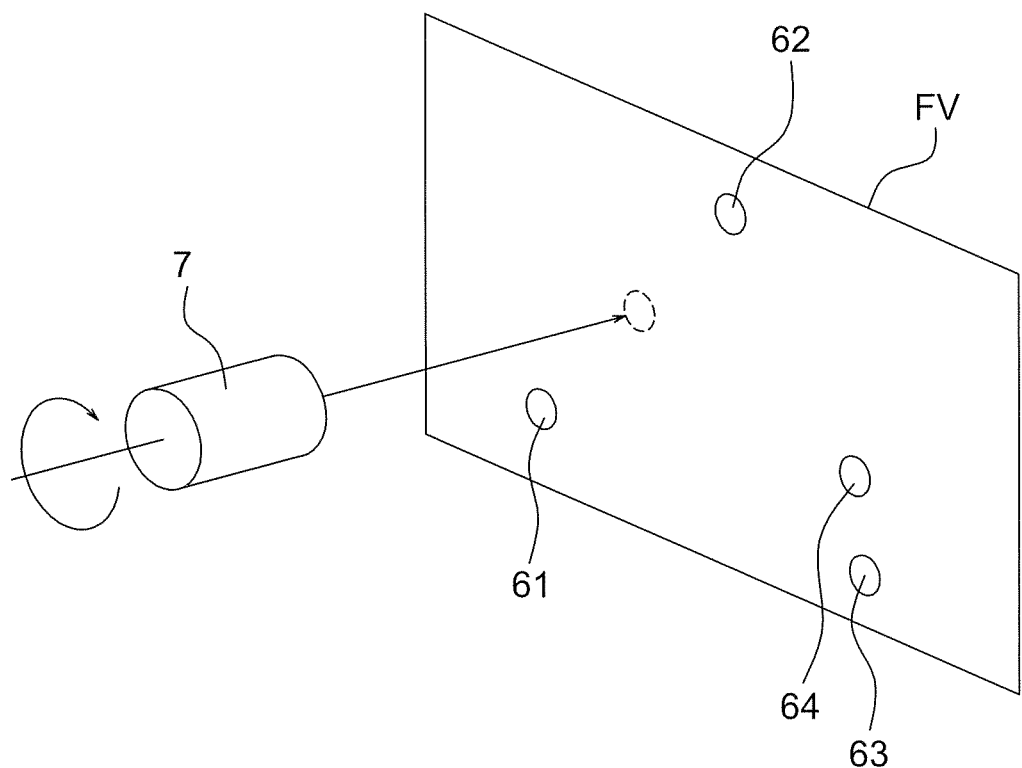
FIG. 3 shows a schematic diagram of the pointing system and the display system according to an embodiment of the present disclosure in which four reference marks are included.

For example in one embodiment, the display system according to the embodiment of the present disclosure may include at least three non-colinear positioning reference marks 61-63 having different recognition codes and an auxiliary reference mark 64 located on or adjacent to a connection line between two of the reference marks 61-63 as shown in FIG. 3, i.e. N=4. The remote controller 7 is configured to detect the positioning reference marks 61-63 and the auxiliary reference mark 64. In this manner, the remote controller 7 may obtain the recognition codes of the positioning reference marks 61-63 according to the spatial relationship between the positioning reference marks 61-63 and the auxiliary reference mark 64. When the remote controller 7 has a rotation with respect to the positioning reference marks 61-63 (as the arrow shown in FIG. 3) in capturing image frames, the positioning reference marks 61-63 can still be recognized correctly so as to accordingly perform the coordinate calculation properly. Details of performing the pointer positioning by using 4 reference marks may be referred to U.S. Patent Publication No. 20060261247 assigned to the same assignee of the present application. However it should be mentioned that the method of performing the pointer positioning by using 4 reference marks is not limited thereto. In addition, according to different algorithms, the arrangement of the reference marks may be different, e.g. at 4 corners.

When the remote controller 7 is closer to the reference marks 61-64 or the operation angle thereof is deviated from the reference marks to cause the field of view FV to cover only a part of the reference marks, the remote controller 7 performs the pointer positioning, calculate the pointing coordinate, calculate the cursor coordinate and/or calculate the relative displacement according to the positioning algorithm associated with different reference mark images.

Figure 4:
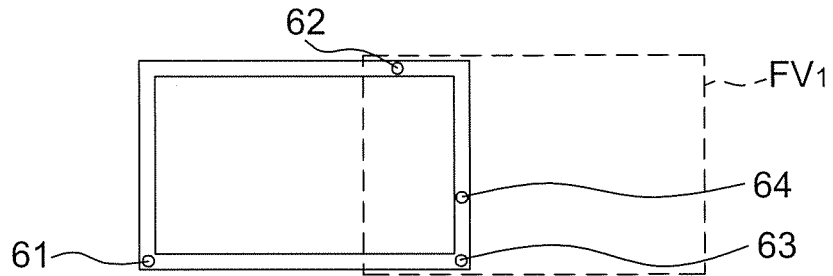
FIG. 4 shows an operational schematic diagram of the display system according to the embodiment of the present disclosure, wherein only three reference marks are covered within a field of view of the image sensor.

In one embodiment, when a field of view $FV_1$ covers 3 reference marks 62-64 without covering the reference mark 61 as shown in FIG. 4, the remote controller 7 (or the processing unit 72) may recognize that the image frame only includes 3 reference mark images. Now the remote controller 7 may label every reference mark image in the image frame and calculate a projection transformation matrix of the reference mark images, and then map the projection transformation matrix onto a plane coordinate space so as to calculate the rotation angle and the aiming coordinate. Details of performing the pointer positioning and/or calculating the cursor coordinate by using the transformation matrix calculated from three reference mark images may be referred to U.S. Pat. Nos. 7,857,703, 7,611,412 and 8,206,221 assigned to the same assignee of the present application. However it should be mentioned that the method of performing the pointer positioning by using 3 reference marks is not limited thereto. Similarly, the arrangement of the reference marks and the reference marks covered within the field of view $FV_1$ are not limited to those disclosed in FIG. 4.

Figure 5:
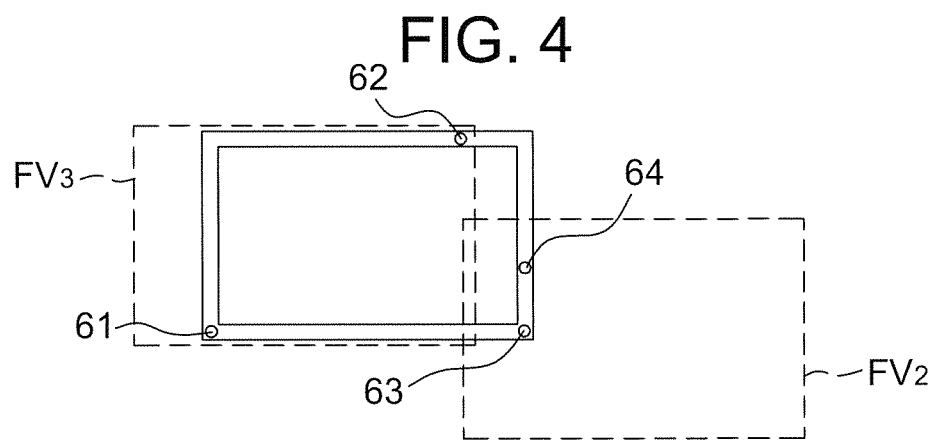
FIG. 5 shows an operational schematic diagram of the display system according to the embodiment of the present disclosure, wherein only two reference marks are covered within a field of view of the image sensor.

In one embodiment, when the field of view covers 2 reference marks, the remote controller 7 (or the processing unit 72) may recognize that the image frame only includes 2 reference mark images, e.g. the field of view $FV_2$ or $FV_3$ shown in FIG. 5. Now the remote controller 7 may perform the distance compensation and the angle compensation according to the 2 reference mark images to correctly perform the pointer positioning and/or calculate the cursor coordinate. Details of the positioning algorithm by using 2 reference mark images may be referred to U.S. Patent Publication No. 20070273646 and 20080158436 assigned to the same assignee of the present application.

Similarly, the arrangement of the reference marks and the reference marks covered within the field of view $FV_2$ or $FV_3$ are not limited to those disclosed in FIG. 5.

Figure 6:
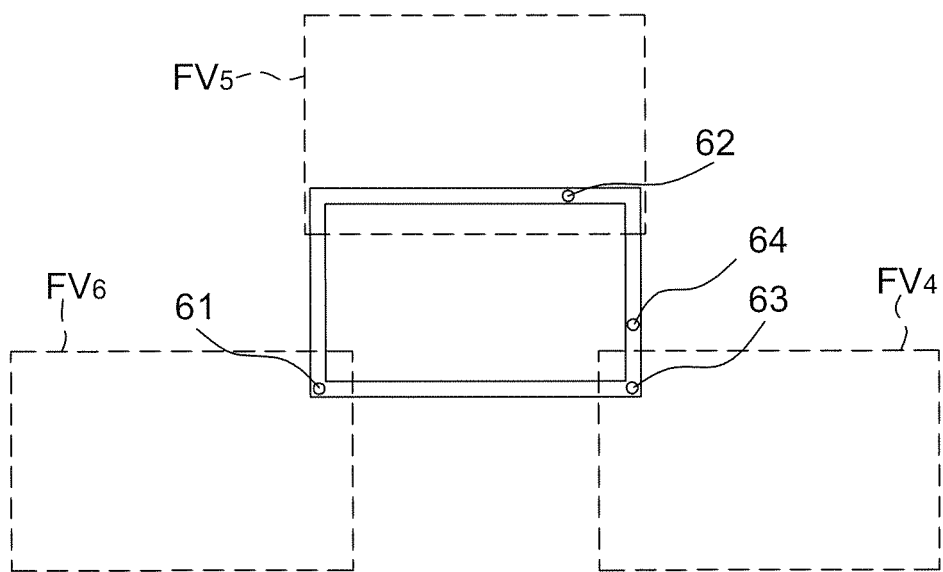
FIG. 6 shows an operational schematic diagram of the display system according to the embodiment of the present disclosure, wherein only one reference mark is covered within a field of view of the image sensor.

In one embodiment, when the field of view covers 1 reference mark, the remote controller 7 (or the processing unit 72) may recognize that the image frame only includes 1 reference mark image, e.g. field of views $FV_4$-$FV_6$ shown in FIG. 6. Now the remote controller 7 may calculate a relative displacement according to the position variation of the reference mark image in the image frames. In addition, in order to detect the rotation angle of the remote controller 7, the remote controller 7 preferably includes an accelerometer 75 configured to correct the obtained coordinate position of the reference mark image according to an acceleration sensing signal, or the reference marks may be designed to have the feature (e.g. the alphabet "L") for identifying the rotation angle and correcting the obtained coordinate position of the reference mark image.

Figure 6A:
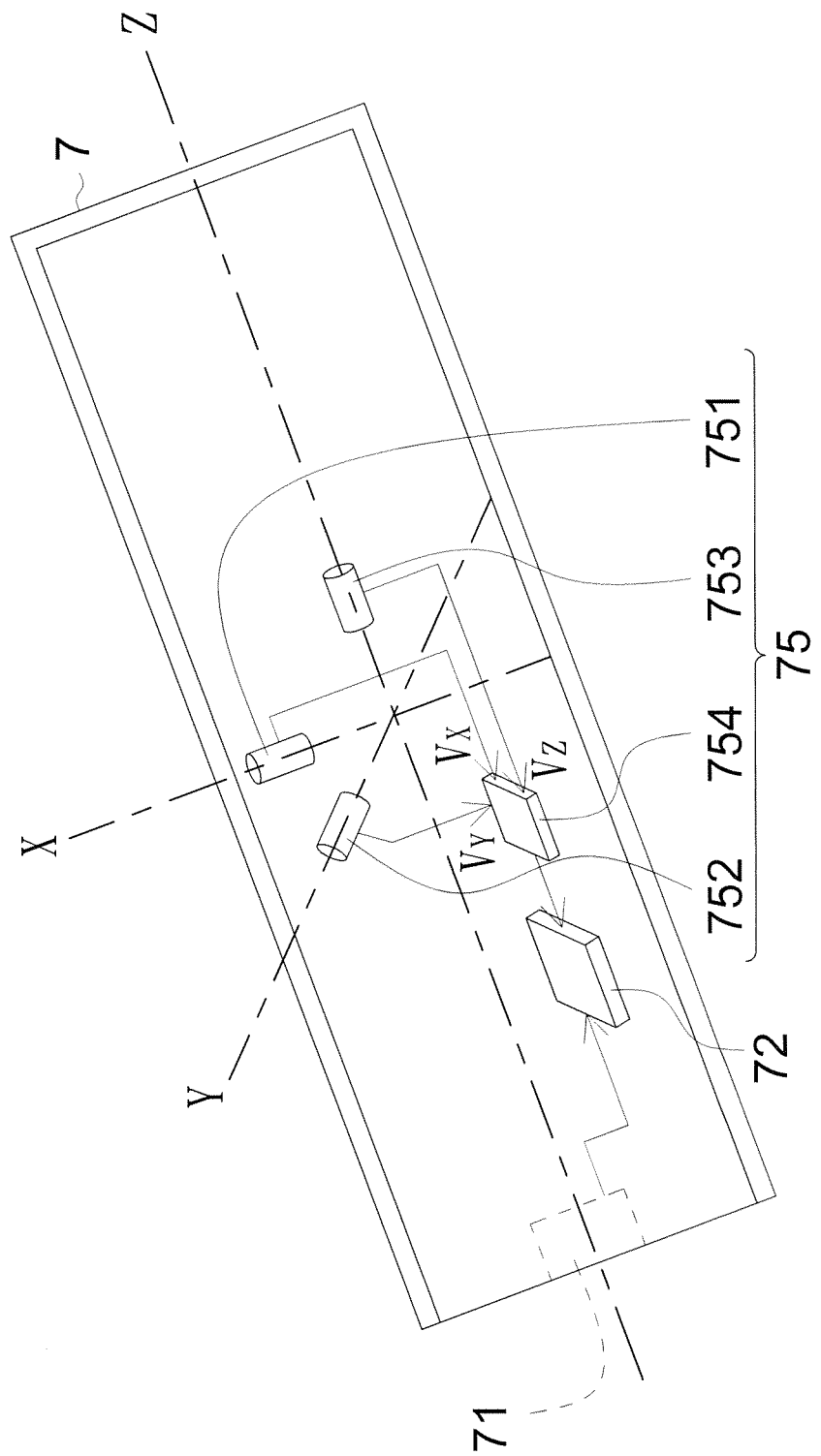
FIG. 6A shows an operational schematic diagram of the display system according to the embodiment of the present disclosure, wherein the remote controller includes an accelerometer.

For example FIG. 6A shows a perspective view of the remote controller 7 according to an embodiment of the present disclosure which includes the image sensor 71, the accelerometer 75 and the processing unit 72. The accelerometer 75 is configured to detect acceleration values $V_X$, $V_Y$ and $V_Z$, wherein the acceleration values $V_X$, $V_Y$ and $V_Z$ respectively indicate the acceleration values in three dimensions of the space (e.g. represented by three axes X, Y and Z). In this embodiment, the accelerometer 75 includes three acceleration sensors (e.g. labeled by 751-753 respectively) and a control circuit 754. The acceleration sensors 751-753 are respectively configured to detect the acceleration values $V_X$, $V_Y$ and $V_Z$, and respectively output the detected acceleration value to the control circuit 754. The control circuit 751 is configured to identify whether an absolute value of a sum of the acceleration values $V_X$, $V_Y$ and $V_Z$ falls into a predetermined acceleration range, wherein said predetermined acceleration range may be a gravity force. When the identified result shows that the absolute value falls in the predetermined acceleration range, the control circuit 754 generates an acceleration sensing signal for indicating a ratio of two of the acceleration values, e.g. a ratio of $V_X$ and $V_Y$.

As the longer edge of the image frame captured by the image sensor 71 is set as parallel to the X-axis and the shorter edge of the image frame captured by the image sensor 71 is set as parallel to the Y-axis, when the user holds the remote controller 7 suspendedly and allowing the sensing axis of the acceleration sensor 752 to be substantially parallel to the direction of gravity and the sensing axes of the acceleration sensors 751 and 753 to be substantially perpendicular to the direction of gravity, the acceleration value $V_Y$ may be +g or −g, and the acceleration values $V_X$ and $V_Z$ are equal to 0. On the contrary, when the user holds the remote controller 7 suspendedly with the wrist of the hand holding the remote controller 7 being rotated by 180 degrees to allow the image captured by the image sensor 71 to be rotated by 180 degrees at the same time and allowing the sensing axis of the acceleration sensor 752 to be substantially parallel to the direction of gravity and the sensing axes of the acceleration sensors 751 and 753 to be substantially perpendicular to the direction of gravity, the acceleration value $V_Y$ may be +g or −g, and the acceleration values $V_X$ and $V_Z$ are equal to 0.

Accordingly, the control circuit 754 may identify whether an absolute value of a sum of the acceleration values $V_X$, $V_Y$ and $V_Z$ falls into a gravity force. When the identified result shows that the absolute value does not fall into the gravity force, it means that the remote controller 7 is receiving an outer force to have a sudden movement and thus the control circuit 754 does not output any signal; whereas when the identified result shows that the absolute value falls into the gravity force, the control circuit 754 generates an acceleration sensing signal to indicate a ratio of $V_X$ and $V_Y$. As the acceleration sensing signal indicates a ratio of $V_X$ and $V_Y$, after receiving an optical sensing signal of the image sensor 71 and an acceleration sensing signal of the accelerometer 75, the processing unit 72 (72') may identify the rotation angle along the axis of the remote controller 7 and correct the coordinate position in the optical sensing signal according to the acceleration sensing signal to accordingly generate an output signal. In this manner, the host associated with the remote controller 7 may control the object shown on the screen of the display device according to the output signal, e.g. controlling the cursor on the screen, without mistake.

The positioning algorithm using one reference mark image may be referred to Taiwan Patent Application No. TW101120524 (U.S. counterpart application Ser. No. 13/771,072) assigned to the same assignee of the present application. Similarly, the arrangement of the reference marks and the reference marks covered within the field of views $FV_4$-$FV_6$ are not limited to those disclosed in FIG. 6.

Although the above embodiments describe that the remote controller 7 may capture the image frame IF containing 1-4 reference mark images, but the present disclosure is not limited thereto. The display system and the pointing system according to the embodiment of the present disclosure may also include more than 4 reference marks. In one embodiment, when the remote controller 7 recognizes more than 4 reference mark images, it is possible to select four of the reference mark images and perform the pointer positioning and/or calculate the cursor coordinate according to the corresponding positioning algorithm. In another embodiment, the remote controller 7 (or the processing unit 72') may further save the corresponding positioning algorithm, e.g. a method of performing the pointer positioning according to the transformation matrix calculated according to 6 reference marks in the U.S. Patent Publication No. 20090153479 which is assigned to the same assignee of the present application, and the remote controller 7 may operate according to the corresponding positioning algorithm.

Figure 7A:
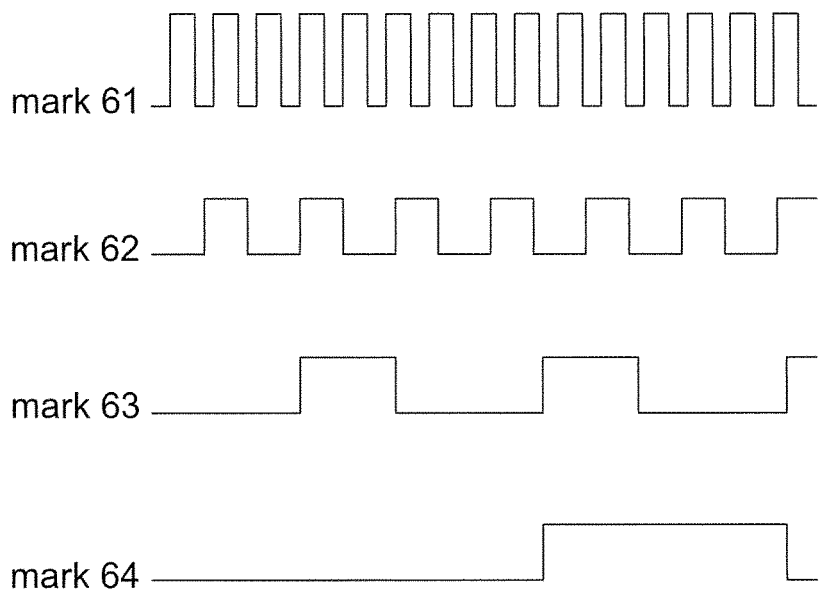
FIG. 7A shows a schematic diagram of different illumination frequencies of different reference marks in the pointing system and the display system according to the embodiment of the present disclosure.
Figure 7B:
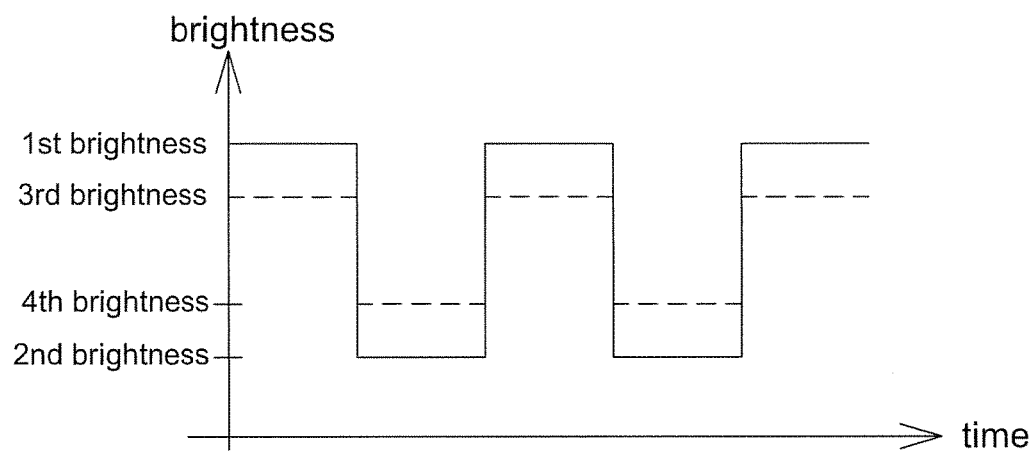
FIG. 7B shows a schematic diagram of different illumination brightness values of different reference marks in the pointing system and the display system according to the embodiment of the present disclosure.
Figure 7C:
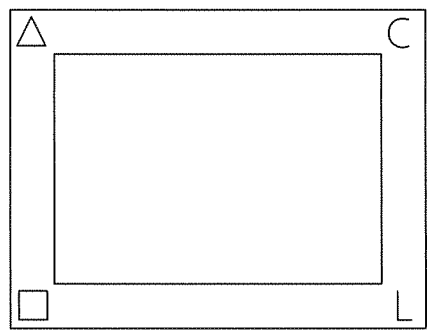
FIGS. 7C-7D show schematic diagrams of different features of different reference marks in the pointing system and the display system according to the embodiment of the present disclosure.
Figure 7D:
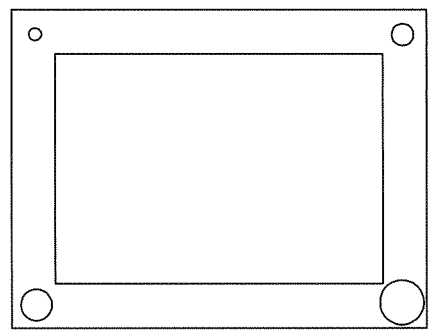

In addition, as mentioned above the remote controller 7 (or the processing unit 72) is preferably able to distinguish each reference mark in some conditions. Accordingly, the display system and the pointing system according to the embodiment of the present disclosure preferably further include a modulation unit configured to modulate an illumination frequency and/or an illumination brightness value of the reference marks, and the remote controller 7 has the demodulation function so as to recognize different reference marks. For example, the modulation unit may modulate different reference marks with different modulation frequencies to allow the different reference marks to have different features as shown in FIG. 7A, wherein the method of distinguishing different reference marks and distinguishing the reference marks from ambient light according to different frequencies may be referred to U.S. Patent Publication No. 20081080396 assigned to the same assignee of the present application. For example, the modulation unit may modulate different reference marks with different brightness values to allow the different reference marks to have different features as shown in FIG. 7B, wherein the method of distinguishing different reference marks and distinguishing the reference marks from ambient light according to different brightness values may be referred to U.S. Patent Publication No. 20110032230 assigned to the same assignee of the present application. In addition, the remote controller 7 may further distinguish different reference marks and distinguish the reference marks from ambient light according to the feature of the reference mark images, e.g. other features may be given to different reference marks such as different shapes (as FIG. 7C) or different areas (as FIG. 7D) for being distinguished by the remote controller 7.

In one embodiment, different features of the reference marks may be formed by arranging a plurality of dot light sources. In other words, each reference mark may be formed by arranging a plurality of dot light sources, and the remote controller 7 takes the arranged reference mark as a whole without distinguishing individual dot light sources which are arranged to form one reference mark.

As mentioned above, as the remote controller 7 in the present disclosure only needs to capture at least one reference mark image, the operable distance and operable field of view are increased. In addition, in some cases it is possible to use the image sensor having a smaller sensing array thereby reducing the cost.

In addition, in another embodiment the remote controller 7 (or the processing unit 72') may save only two positioning algorithms, e.g. the display system or the pointing system including N reference marks (e.g. the reference mark number N may be 4, but not limited to). The remote controller 7 is also configured to capture image frames containing at least one reference mark image of the reference marks (e.g. reference marks 61-64 in FIG. 2A) and recognize a reference mark image number according to the image frames. When the reference mark image number is equal to N, the remote controller 7 outputs a pointing coordinate according to the image frames, whereas when the reference mark image number is smaller than N, the remote controller 7 outputs a relative displacement according to the image frames.

For example when the reference mark image number is equal to N (e.g. N=4), the remote controller 7 enters a first mode. In the first mode the remote controller 7 calculates the pointing coordinate or cursor coordinate according to the positioning algorithm associated with 4 reference mark images mentioned above. When the reference mark image number is smaller than N, the remote controller 7 may calculate the relative displacement according to the movement of at least one reference mark image in the image frames and output the relative displacement to the display device 5 to accordingly control the movement of cursor, wherein when the reference mark image number is smaller than N and larger than 1, the remote controller 7 may calculate the relative displacement according to one of the reference mark images or an average position (e.g. the center or gravity center) of the reference mark images in the image frames. The selected reference mark image may be distinguished and selected according to the different features mentioned above.

Figure 8:
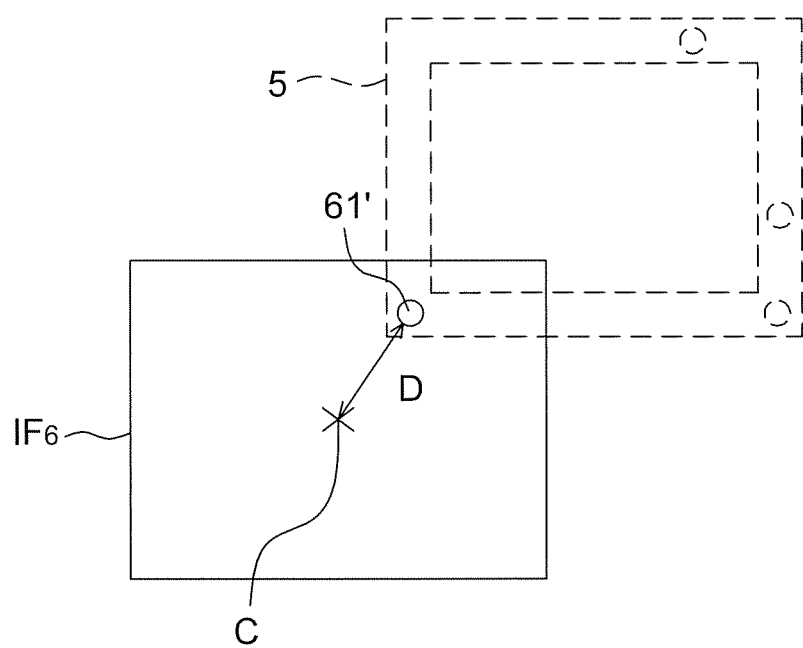
FIG. 8 shows an operational schematic diagram of the pointing system and the display system according to the embodiment of the present disclosure.

As shown in FIG. 8, in one embodiment when an aiming point of the remote controller 7 is a center point C of the image frame $IF_6$ (e.g. corresponding to $FV_6$ of FIG. 6) captured by the image sensor 71, the processing unit 72 may obtain the pointing coordinate or the relative displacement of the cursor 511 according to the relative position relationship (e.g. the distance D) between the reference mark image 61' and the center point C of the image frame $IF_6$ as well as the hardware parameter of the display device 5. In another embodiment, when the image frame $IF_6$ includes two reference mark images, the processing unit 72 may obtain the pointing coordinate or the relative displacement of the cursor 511 according to the relative position relationship between an average position or a center position of the reference mark images and the center point C of the image frame $IF_6$ as well as the hardware parameter of the display device 5.

As mentioned above, the conventional estimation method of an aiming point has to perform the pointer positioning according to all system beacon images, but it may not function correctly when there are missing system beacon images or the pointer positioning can only be performed by estimating the missing image information at first such that it has a smaller operable range. Therefore, the present disclosure further provides a display system and a pointing system (FIGS. 2A and 2B) that may perform the pointer positioning, calculate the cursor coordinate, calculate the pointing coordinate and/or calculate the displacement according to the information of different numbers of the reference mark image and different positioning algorithms thereby having a larger effective operable field of view and a larger operable distance.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A pointing system, comprising:
   a plurality of reference marks illuminating with an identifiable spectrum;
   a remote controller comprising:
   a memory unit configured to previously store different positioning algorithms, each of the different positioning algorithms being associated with a predetermined total number of reference marks, and at least two of the predetermined total numbers associated with the different positioning algorithms being different from one another, and
   an image sensor configured to capture an image frame containing at least one reference mark image of the reference marks,
   the remote controller configured to
   recognize a total number of the at least one reference mark image in the captured image frame,
   select a first positioning algorithm among the different positioning algorithms when the total number of the at least one reference mark image in the captured image frame is a first number, and output a cursor coordinate calculated by the first positioning algorithm to control a cursor shown on a display screen, and
   select a second positioning algorithm among the different positioning algorithms when the total number of the at least one reference mark image in the captured image frame is a second number different from the first number, and output a relative displacement of the cursor calculated by the second positioning algorithm to control the cursor on the display screen,
   wherein the predetermined total number of reference marks associated with the first and second positioning algorithms is related to the total number of the at least one reference mark image in the captured image frame, and
   wherein the first and second positioning algorithms are configured to respectively output the cursor coordinate and the relative displacement using the at least one reference mark image in the image frame captured by the same image sensor.

2. The pointing system as claimed in claim 1, wherein the reference marks are integrated with a display device having the display screen.

3. The pointing system as claimed in claim 1, wherein the remote controller further comprises an accelerometer.

4. The pointing system as claimed in claim 1, wherein the remote controller further comprises a processing unit configured to execute the different positioning algorithms.

5. The pointing system as claimed in claim 4, wherein the predetermined total numbers comprise 1, 2, 3 and 4; and when the total number of the at least one reference mark image in the captured image frame is larger than 4, the processing unit performs pointer positioning according to the positioning algorithm associated with the predetermined total number of 4 reference marks.

6. The pointing system as claimed in claim 1, further comprising a modulation unit configured to modulate at least one of an illumination frequency and an illumination brightness value of the reference marks.

7. The pointing system as claimed in claim 1, wherein the remote controller further distinguishes different reference marks and distinguishes the reference marks from ambient light according to features of the reference mark images.

8. A pointing system, comprising:
a plurality of reference marks illuminating with an identifiable spectrum; and
a remote controller comprising an image sensor and a memory unit, the memory unit configured to previously store a first positioning algorithm for calculating a pointing coordinate and a second positioning algorithm for calculating a relative displacement, and the remote controller configured to
capture, by the image sensor, an image frame containing at least one reference mark image of the reference marks,
distinguish the reference marks from ambient light according to features of the at least one reference mark image,
recognize a total number of the at least one reference mark image in the captured image frame,
select the first positioning algorithm and output the pointing coordinate according to the image frame when the total number of the at least one reference mark image in the captured image frame is equal to a total number of the reference marks, and
select the second positioning algorithm and output the relative displacement according to the image frame when the total number of the at least one reference mark image in the captured image frame is smaller than the total number of the reference marks,
wherein the first positioning algorithm and the second positioning algorithm are configured to respectively output the pointing coordinate and the relative displacement using the at least one reference mark image in the image frame captured by the same image sensor.

9. The pointing system as claimed in claim 8, wherein when the total number of the at least one reference mark image in the captured image frame is smaller than the total number of the reference marks and larger than 1, the remote controller is configured to calculate the relative displacement according to one of the reference mark images or an average position of the reference mark images in the image frame.

10. The pointing system as claimed in claim 8, wherein the total number of the reference marks is 4.

11. The pointing system as claimed in claim 8, wherein the remote controller further comprises an accelerometer.

12. The pointing system as claimed in claim 8, further comprising a modulation unit configured to modulate at least one of an illumination frequency and an illumination brightness value of the reference marks.

13. The pointing system as claimed in claim 8, wherein the remote controller is further configured to distinguish different reference marks according to features of different reference mark images.

14. A pointing system, comprising:
4 reference marks illuminating with an identifiable spectrum; and
a remote controller comprising an image sensor and a memory unit, the memory unit configured to previously store a first positioning algorithm associated with 4 reference mark images for calculating a pointing coordinate and a second positioning algorithm associated with one reference mark image for calculating a relative displacement, and the remote controller configured to
capture, by the image sensor, an image frame containing at least one reference mark image of the reference marks,
recognize a total number of the at least one reference mark image in the captured image frame,
select the first positioning algorithm and output the pointing coordinate according to the image frame when the total number of the at least one reference mark image in the captured image frame is 4, and
select the second positioning algorithm and calculate the relative displacement according to one of the reference mark images, selected according to predetermined features of the 4 reference marks, in the image frame when the total number of the at least one reference mark image in the captured image frame is not 4,
wherein the first positioning algorithm and the second positioning algorithm are configured to respectively output the pointing coordinate and the relative displacement using the at least one reference mark image in the image frame captured by the same image sensor.

* * * * *